United States Patent [19]

Suzuki et al.

[11] 4,112,648

[45] Sep. 12, 1978

[54] WALL STRUCTURE OF HOT FLUID CHAMBER

[75] Inventors: Hiroshige Suzuki, Tokyo; Eizi Horie, Aichi; Hideo Nagashima, Tokyo, all of Japan

[73] Assignee: The President of the Agency of Industrial Science and Technology, Tokyo, Japan

[21] Appl. No.: 846,939

[22] Filed: Oct. 31, 1977

[30] Foreign Application Priority Data

Nov. 8, 1976 [JP] Japan .......................... 51/148976[U]

[51] Int. Cl.² ...................... E04G 11/04; B65D 25/18
[52] U.S. Cl. .......................................... 52/508; 52/249;
52/265; 52/268; 52/269; 52/448; 52/509;
52/513; 52/575; 176/87; 176/DIG. 2
[58] Field of Search .................. 220/9 R, 15; 110/1A;
52/249, 265, 268, 269, 508, 513, 509, 573, 447,
448, 575; 176/87, DIG. 2

[56] References Cited

U.S. PATENT DOCUMENTS

| 331,500 | 12/1885 | Higgins | 52/575 |
|---|---|---|---|
| 336,517 | 2/1886 | Fulton | 52/448 |
| 654,532 | 7/1900 | Furness | 52/575 |
| 899,410 | 9/1908 | Kilbride | 52/590 |
| 1,719,475 | 7/1929 | Jacobus et al. | 52/573 X |
| 3,016,655 | 1/1962 | Hosbein | 52/269 X |
| 3,245,179 | 4/1966 | Hawkins | 52/573 X |
| 3,963,936 | 6/1976 | Lowe | 52/573 X |
| 3,979,866 | 9/1976 | Prescott | 52/573 X |
| 3,991,899 | 11/1976 | Vaessen | 52/573 X |

FOREIGN PATENT DOCUMENTS

| 44,186 | 12/1908 | Switzerland | 52/513 |
|---|---|---|---|
| 926,006 | 5/1963 | United Kingdom | 176/DIG. 2 |

Primary Examiner—Alfred C. Perham
Attorney, Agent, or Firm—Flynn & Frishauf

[57] ABSTRACT

Wall structure of a hot fluid chamber, comprising
an inner metal wall;
a plurality of support pins regularly arranged on and projecting outward from the surface of the inner metal wall;
a plurality of coupling members fixed to the inner metal plate by the support pins, each coupling member being of a truncated quadrangular pyramid shape and made of a heat-insulating refractory material;
a plurality of heat-insulating refractory blocks mounted between the coupling members, each block having the underside portion provided with a cushioning layer formed of an elastic refractory material;
a heat-insulating layer formed of an elastic refractory material and covering the surfaces of the coupling members and of the heat-insulating refractory blocks; and
an outer metal wall covering the heat-insulating layer.

5 Claims, 5 Drawing Figures

WALL STRUCTURE OF HOT FLUID CHAMBER

BACKGROUND OF THE INVENTION

This invention relates to a wall structure of a hot fluid chamber, for example, a chamber of a hot gas generated from a nuclear reactor.

In general, a hot fluid chamber such as a heat exchanger should be high in heat-insulating property and in durability against thermal expansion of the inner metal wall directly contacting the hot fluid. The wall of a conventional hot fluid chamber is prepared by arranging refractory blocks such as bricks on the outer surface of the inner metal wall, with mortar or the like used for filling the clearances between the refractory blocks. However, the conventional wall structure of this type is not satisfactory in heat-insulating property and in durability. In particular, the mortar or the like filling the clearances between the refractory blocks tends to be broken because of the thermal expansion of the inner metal wall. Needless to say, the breakage of the filling material must be avoided particularly when it comes to a chamber of a hot gas generated from a nuclear reactor.

SUMMARY OF THE INVENTION

An object of this invention is to provide a wall structure of a hot fluid chamber, which exhibits a high heat-insulating property and is capable of absorbing the thermal expansion and shrinkage of the inner metal wall, leading to a high durability.

Another object is to provide a wall structure of a hot fluid chamber, which disuses mortar for filling the clearances between the refractory blocks.

According to this invention, there is provided a wall structure of a hot fluid chamber, comprising
an inner metal wall;
a plurality of support pins projecting outward from the outer surface of the inner metal wall and equidistantly arranged in both the longitudinal and lateral directions of the inner metal wall;
a plurality of coupling members made of a heat-insulating refractory material and fixed to the inner metal wall by the support pins, each coupling member being of a truncated quadrangular pyramid shape;
a plurality of heat-insulating refractory blocks mounted between the coupling members, each block being capable of a sliding motion along the side faces of the coupling member and having the underside portion provided with a cushioning layer formed of an elastic refractory material;
a heat-insulating layer formed of an elastic refractory material and uniformly covering the outer faces of the coupling members and of the heat-insulating refractory blocks; and
an outer metal wall covering the heat-insulating layer.

In a preferred embodiment of this invention, the heat-insulating refractory blocks comprise rod-like blocks and plate-like blocks. The upper and lower faces of the rod-like block are oblong. On the other hand, two side faces of the rod-like block facing with each other are of a trapezoidal shape and conform with two side faces of the coupling member. Further, the remaining two side faces of the rod-like block facing with each other are of a reversed trapezoidal shape. It is important to note that the rod-like block is mounted between two adjacent coupling members in a manner that the two trapezoidal side faces of the block are brought into contact with and allowed to make a sliding motion along the trapezoidal side faces of the coupling member.

The plate-like refractory block is of a reversed truncated quadrangular pyramid shape and mounted in the concavity defined by four rod-like refractory blocks. Incidentally, any of the four side faces of the plate-like block is of a reversed trapezoidal shape. It follows that the four side faces of the plate-like block are capable of making a sliding motion along the reversed trapezoidal side faces of the rod-like blocks.

DETAILED DESCRIPTION OF THE PREFERRED EMBODIMENTS

Figure 1:
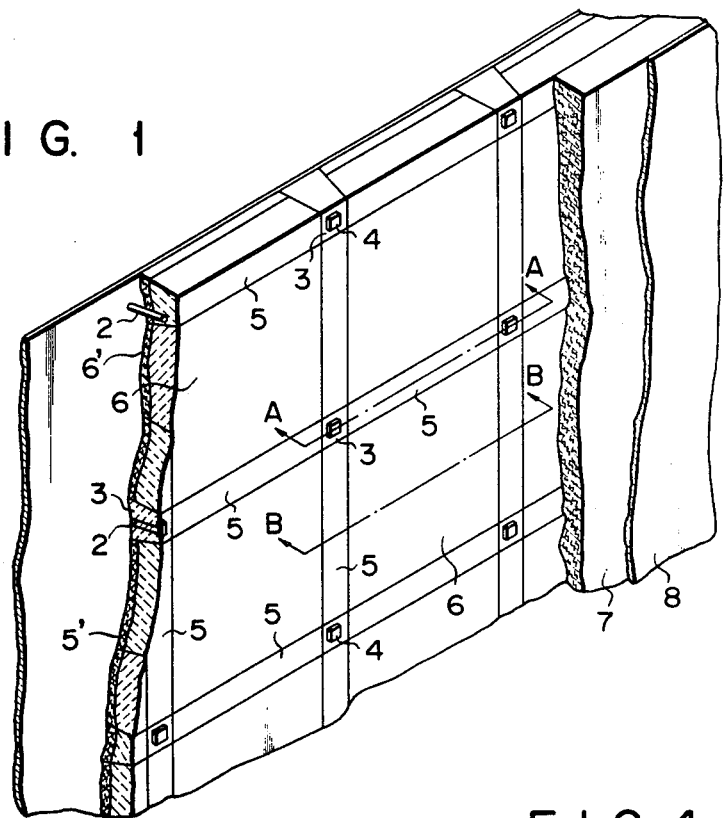
FIG. 1 is a perspective view, partly broken away, of a wall structure of a hot fluid chamber according to one embodiment of this invention.

As shown in FIG. 1, a number of support pins 2 made of a heat-resistant steel are fixed by, for example, welding to the outer surface of an inner metal wall 1 also made of a heat-resistant steel such as SUS 304. It is seen that the support pins are equidistantly provided in both the longitudinal and lateral directions of the inner metal wall 1 and project outward from the outer surface of the inner metal wall. The interval between adjacent support pins may be determined optionally with the sizes of the inner metal wall and of the heat-insulating refractory blocks taken into account.

A coupling member 3 of a truncated quadrangular pyramid shape is fixed to the inner metal wall 1 by the support pin 2. Incidentally, the coupling member 3 has square upper and lower faces and is provided with a hole extending from the lower face to the upper face. The support pin 2 is inserted through the hole and a fixing member 4 is fitted to the tip of the support pin so as to fix the coupling member 3 to the inner metal wall 1. The coupling member 3 is made of a heat-insulating refractory material such as sintered quartz glass, sintered silicon nitride and brick. Also, the inclination angle of any of the four trapezoidal side faces of the coupling member 3 relative to the vertical axis of the coupling member 3 depends on the thermal expansion coefficient of the inner metal wall 1, the distance between adjacent support pins, etc., and in general ranges from several degrees to scores of degrees.

Figure 4:
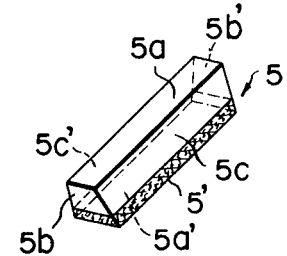
FIG. 4 is a perspective view of a rod-like heat-insulating refractory block.
Figure 5:
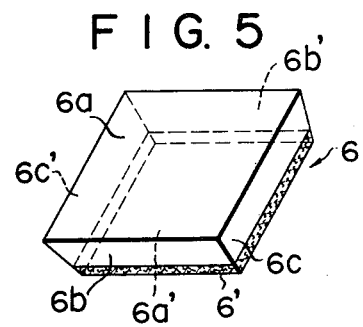
FIG. 5 is a perspective view of a plate-like heat-insulating refractory block.

Rod-like heat-insulating refractory blocks 5 are mounted between the fixed coupling members 3. Plate-like heat-insulating refractory blocks 6 are mounted in the concavity defined by the four rod-like heat-insulating refractory blocks 5. Each of these blocks 5 and 6 are made of a heat-insulating refractory material such as sintered quartz glass, sintered silicon nitride or brick, and has the underside portion provided with a cushioning layer formed of an elastic refractory material such as ceramic fiber. FIGS. 4 and 5 show that the blocks 5 and 6 are provided with cushioning layers 5' and 6', respectively. In the drawings, reference numerals 5a' and 6a' denote the lower faces of the blocks 5 and 6, respectively, which are brought into direct contact with the inner metal wall 1.

As shown in FIG. 4, the rod-like heat-insulating block 5 has an oblong upper face 5a, an oblong lower face 5a', trapezoidal side faces 5b, 5b' conforming with the side faces of the coupling member 3, and reversed trapezoidal side faces 5c, 5c'. The block 5 of this particular shape is mounted between two adjacent coupling members 3 such that the trapezoidal side faces 5b, 5b' of the block 5 are capable of a sliding motion along the trapezoidal side faces of the coupling members 3.

Figure 2:
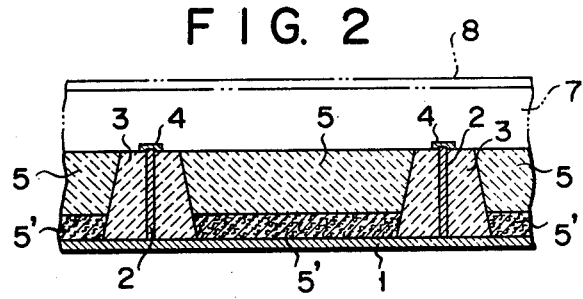
FIG. 2 is a cross sectional view along the line A—A of FIG. 1.
Figure 3:
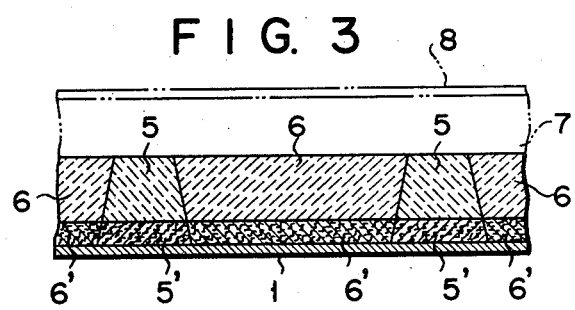
FIG. 3 is a cross sectional view along the line B—B of FIG. 1.

On the other hand, the plate-like heat-insulating refractory block 6 is of a reversed truncated quadrangular pyramid shape. Namely, the block 6 has a square upper face 6a, a square lower face 6a' and reversed trapezoidal side faces 6b, 6b', 6c and 6c', as shown in FIG. 5. The block 6 of this particular shape is mounted in the concavity defined by four rod-like blocks 5 mounted between the coupling members 3. As shown in FIGS. 2 and 3, it is convenient that the coupling member 3, the rod-like block 5 and the plate-like block 6 be of substantially the same height.

The upper faces of the coupling members 3 and of the blocks 5 and 6 are uniformly covered with a heat-insulating layer 7 formed of an elastic refractory material like ceramic fiber. Further, the heat-insulating layer 7 is covered with an outer metal wall 8 formed of a heat-resistant steel like SUS 304.

In the wall structure described, the thermal expansion or shrinkage of the inner metal wall directly contacting a hot fluid is absorbed by relative motions of the coupling member and the two types of the heat-insulating refractory blocks, resulting in marked improvement of durability. Suppose a gas of about 1,000° C. flows into the hot fluid chamber. In this case, the inner metal wall 1 directly contacting the hot gas is caused to expand in two dimensional directions, i.e., both in longitudinal and lateral directions. However, this expansion is converted into relative sliding motions between and inclined trapezoidal side faces of the coupling member 3 and the trapezoidal side faces 5b, 5b' of the rod-like block 5 and between the reversed trapezoidal side faces 5c, 5c' of the block 5 and the reversed trapezoidal side faces 6b, 6b' and/or 6c, 6c' of the plate-like block 6. More specifically, the two dimensional expansion of the inner metal wall 1 brings about elongation of the distance between adjacent support pins 2 and, thus, between the coupling members 3 fixed by the support pins 2. Naturally, the rod-like blocks 5 mounted between the coupling members 3 are caused to make sliding motions along the side faces of the coupling members 3 toward the inner metal wall 1 together with the plate-like blocks 6, thereby compressing the cushioning layers 5' and 6' of the blocks 5 and 6, respectively. Incidentally, the sliding mentioned results in unevenness in the outer face level between the coupling member 3 and the heat-insulating refractory blocks 5, 6. However, the elasticity of the heat-insulating layer 7 serves to make up for the unevenness.

As described in detail, all the side faces of the fixed coupling member are of a trapezoidal shape and the heat-insulating refractory blocks are shaped to be capable of sliding motions along the trapezoidal side faces of the coupling member. This particular construction enables the wall structure to exhibit a high durability and renders it unnecessary to use mortar for filling the clearances between the heat-insulating refractory blocks.

In addition, the wall structure described exhibits a high heat-insulating property because the coupling member and the refractory blocks mounted on the inner metal wall directly contacting a hot fluid are made of a heat-insulating refractory material and the heat-insulating layer made of ceramic fiber is further provided to cover the coupling member and the heat-insulating refractory blocks. The durability and heat-insulating property of the wall structure are prominently improved particularly where a refractory material containing sintered quartz glass as a major component is used as the heat-insulating refractory material.

As described in detail, the wall structure of a hot fluid chamber according to this invention exhibits a high heat-insulating property and a high durability, and is particularly advantageous when used for defining a chamber of a hot gas generated from a nuclear reactor, said chamber leading to a reduction furnace of iron ore, etc.

What we claim is:

1. A wall structure of a hot fluid chamber, comprising an inner metal wall directly contacting a hot fluid;

support pins outwardly projecting from the outer surface of the inner metal wall and equidistantly arranged in both longitudinal and lateral directions of the inner metal wall;

coupling members fixed to the inner metal wall by the support pins, each coupling member made of a heat-insulating refractory material and having a truncated quadrangular pyramid shape;

rod-like heat-insulating refractory blocks, each mounted between two adjacent coupling members, having an oblong upper face, an oblong lower face, two trapezoidal side faces conforming with and making sliding motions along the trapezoidal side faces of the coupling member, two reversed trapezoidal side faces, and a cushioning layer formed of an elastic refractory material and providing the lower portion of the rod-like block;

plate-like heat-insulating refractory blocks, each having a reversed truncated quadrangular pyramid shape, mounted in a concavity formed by four rod-like heat-insulating refractory blocks in a manner to make sliding motions along the reversed trapezoidal side faces of the rod-like blocks, and having a cushioning layer made of an elastic refractory material in the underside portion of the plate-like block;

a heat-insulating layer formed of an elastic refractory material and uniformly covering the outer faces of the coupling members and of the heat-insulating refractory blocks; and an outer metal wall covering the heat-insulating layer.

2. The wall structure according to claim 1, wherein the heat-insulating refractory material is selected from the group consisting of sintered quartz glass, sintered silicon nitride and brick.

3. The wall structure according to claim 1, wherein ceramic fiber is used as the elastic refractory material.

4. The wall structure according to claim 1, wherein the coupling member is provided with a hole extending from the lower face to the upper face and the tip of the support pin projecting through the hole is fitted by a fixing member so as to fix the coupling member to the inner metal wall.

5. The wall structure according to claim 1, wherein the inclination angle of each of the trapezoidal side faces of the coupling member relative to the vertical axis of the coupling member ranges from several degrees to scores of degrees.

* * * * *